United States Patent
Yoon et al.

(10) Patent No.: US 8,258,733 B2
(45) Date of Patent: Sep. 4, 2012

(54) WASHING MACHINE AND METHOD FOR CONTROLLING THE SAME

(75) Inventors: Keun Young Yoon, Hwaseong-si (KR); Young Kwan Kim, Anyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 331 days.

(21) Appl. No.: 12/662,289

(22) Filed: Apr. 8, 2010

(65) Prior Publication Data
US 2010/0270962 A1    Oct. 28, 2010

(30) Foreign Application Priority Data
Apr. 28, 2009    (KR) .................. 10-2009-0036859

(51) Int. Cl.
*H02P 6/08*    (2006.01)
(52) U.S. Cl. .................. 318/400.13; 318/459
(58) Field of Classification Search ............. 318/400.26, 318/400.1, 400.13, 459, 500
See application file for complete search history.

(56) References Cited

U.S. PATENT DOCUMENTS

| | | | |
|---|---|---|---|
| 2004/0061473 A1* | 4/2004 | Boys et al. | 318/778 |
| 2005/0127861 A1* | 6/2005 | McMillan et al. | 318/268 |
| 2006/0066279 A1* | 3/2006 | Brenden et al. | 318/599 |
| 2006/0066280 A1* | 3/2006 | Bhaumik et al. | 318/599 |
| 2009/0295591 A1* | 12/2009 | Bedingfield | 340/660 |
| 2011/0254482 A1* | 10/2011 | Dai | 318/400.13 |
| 2011/0254485 A1* | 10/2011 | Clothier et al. | 318/400.14 |

FOREIGN PATENT DOCUMENTS
| | | |
|---|---|---|
| JP | 10-179978 | 7/1998 |
| JP | 2004-65408 | 3/2004 |

\* cited by examiner

*Primary Examiner* — Mark Budd
(74) *Attorney, Agent, or Firm* — Staas & Halsey LLP (57) ABSTRACT

A washing machine and a method for controlling the same are disclosed. The washing machine detects a back electromotive force of a washing motor, and controls output of an alarm sound by analyzing periodicity of a waveform period of the back electromotive force. The washing machine determines whether a child or pet is in a drum washing machine on the basis of the back electromotive force generated from the washing motor, and informs a user or guardian of the determined result.

21 Claims, 8 Drawing Sheets

WASHING MACHINE AND METHOD FOR CONTROLLING THE SAME

CROSS-REFERENCE TO RELATED APPLICATIONS

This application claims the benefit of Korean Patent Application No. 2009-0036859, filed on Apr. 28, 2009 in the Korean Intellectual Property Office, the disclosure of which is incorporated herein by reference.

BACKGROUND

1. Field

The disclosure relates to a washing machine and a method of controlling the same to prevent the occurrence of an accident.

2. Description of the Related Art

Generally, washing machines are used to separate a pollutant or contaminant from laundry by applying energy, such as impact, to the laundry. The washing machines can be classified into a pulsator washing machine, an agitator washing machine, a drum washing machine, or other types according to various methods of applying energy to laundry.

The pulsator washing machine generates a flow of water by rotating a circular-plate-shaped pulsator, to wash or clean laundry using the flow of water. The agitator washing machine horizontally rotates a wing-shaped agitator located at the center of a washing tub to wash or clean laundry. The drum washing machine drops laundry by rotating a drum to apply impact to the laundry, to wash or clean the laundry, The above-mentioned washing machine performs a washing process for washing or cleaning laundry with water containing a detergent, a rinsing process for rinsing the laundry with clean water, and a dehydration process for dehydrating the laundry.

If the door of the washing machine is closed when a child or pet is inadvertently inside the washing machine, the child or pet has difficulty in escaping from the washing machine. If a user does not check the inside of the washing machine for the presence of the child or pet and uses the washing machine, the washing tub is filled with water during washing and rinsing processes, and the child or pet may drown.

SUMMARY

Therefore, it is an aspect of the present embodiments to provide a washing machine and a method for controlling the same to prevent the occurrence of a drowning accident in the washing machine.

Additional aspects of the disclosure will be set forth in part in the description which follows and, in part, will be apparent from the description, or may be learned by practice of the disclosure.

The foregoing and/or other aspects of the disclosure may be achieved by providing a method of controlling a washing machine including detecting a back electromotive force of a washing motor, and controlling output of an alarm sound by analyzing periodicity of a waveform period of the back electromotive force.

The detecting of the back electromotive force of the washing motor may include detecting a back electromotive force generated by rotation of a drum during a standby mode in which standby power flows.

The analyzing of the periodicity of the waveform period of the back electromotive force may include determining whether a magnitude of the back electromotive force is equal to or less than a reference range, and analyzing the periodicity of the waveform period of the back electromotive force when the magnitude of the back electromotive force is greater than the reference range.

The controlling of the output of the alarm sound may include outputting the alarm sound when the periodicity of the waveform period of the back electromotive force is non-periodic.

The foregoing and/or other aspects of the disclosure are also achieved by providing a method of controlling a washing machine including detecting a back electromotive force of a washing motor, and controlling an opening or closing operation of a door including analyzing a periodicity of a waveform period of the back electromotive force.

The controlling of the opening of the door may include detecting the opening or closing operation of the door when the periodicity of the waveform period of the back electromotive force is non-periodic, and automatically opening the door when the door is closed when the force is non-periodic.

The method may further include outputting an alarm sound when the periodicity of the waveform period of the back electromotive force is non-periodic.

The foregoing and/or other aspects of the disclosure are also achieved by providing a method of controlling a washing machine including rotating a washing motor for a predetermined period of time upon receiving a command starting an operation of a washing machine, detecting a back electromotive force of the washing motor, and analyzing a periodicity of a waveform period of the back electromotive force, and controlling whether the washing machine continues to be operated or not according to the analyzing the periodicity.

The method may further include outputting an alarm sound when the periodicity of the waveform period of the back electromotive force is non-periodic.

The analyzing of the periodicity of the waveform period of the back electromotive force may include determining whether the magnitude of the back electromotive force is equal to or less than a reference range, and analyzing the periodicity of a waveform period of the back electromotive force when the magnitude of the back electromotive force is greater than the reference range.

The analyzing of the waveform period of the back electromotive force may include stopping the operation of the washing machine when the periodicity of the waveform period of the back electromotive force is non-periodic.

The foregoing and/or other aspects of the disclosure are also achieved by providing a washing machine including a drum, a washing motor connected to the drum, a back electromotive force detector to detect a back electromotive force of the washing motor, a controller to control output of an alarm sound by analyzing a periodicity of a waveform period of the detected back electromotive force, and an alarm unit to output the alarm sound according to an indication of the controller.

The controller may determine whether the magnitude of the back electromotive force is equal to or less than a reference range, and may analyze the periodicity of the waveform period of the back electromotive force when the magnitude of the back electromotive force is greater than the reference range.

The washing machine may further include a door to open or close the drum, and an automatic door opening unit to automatically open the door, wherein the controller controls the automatic door opening unit to automatically open the door when the periodicity of the waveform period of the back electromotive force is non-periodic.

The washing machine may further include a door to open or close the drum, and a door locking unit to control locking of the door, wherein the controller controls the door locking unit to release the door when the periodicity of the waveform period of the back electromotive force is non-periodic.

The washing machine may further include an input unit through which an operation start command is entered, wherein the controller controls rotation of the washing motor for a predetermined period of time upon receiving the operation start command from the input unit, thereby determining whether the operation is performed or not.

The controller determines whether the magnitude of the back electromotive force is equal to or less than a reference range when the washing motor stops rotation, and analyzes the periodicity of the waveform period of the back electromotive force when the magnitude of the back electromotive force is greater than the reference range.

The controller may perform the operation when the periodicity of the waveform period of the back electromotive force is periodic, and may stop the operation when the periodicity of the waveform period of the back electromotive force is non-periodic.

The foregoing and/or other aspects of the disclosure are also achieved by providing a method of controlling a washing machine including detecting a back electromotive force of a washing motor when the washing machine is not operated, determining whether the magnitude of the back electromotive force is equal to or less than a reference range, and outputting an alarm sound when the magnitude of the back electromotive force is greater than the reference range.

The method may further include analyzing a periodicity of a waveform period of the back electromotive force when the magnitude of the back electromotive force is greater than the reference range.

The method may further include outputting an alarm sound when the periodicity of the waveform period of the back electromotive force is non-periodic.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

Figure 1:
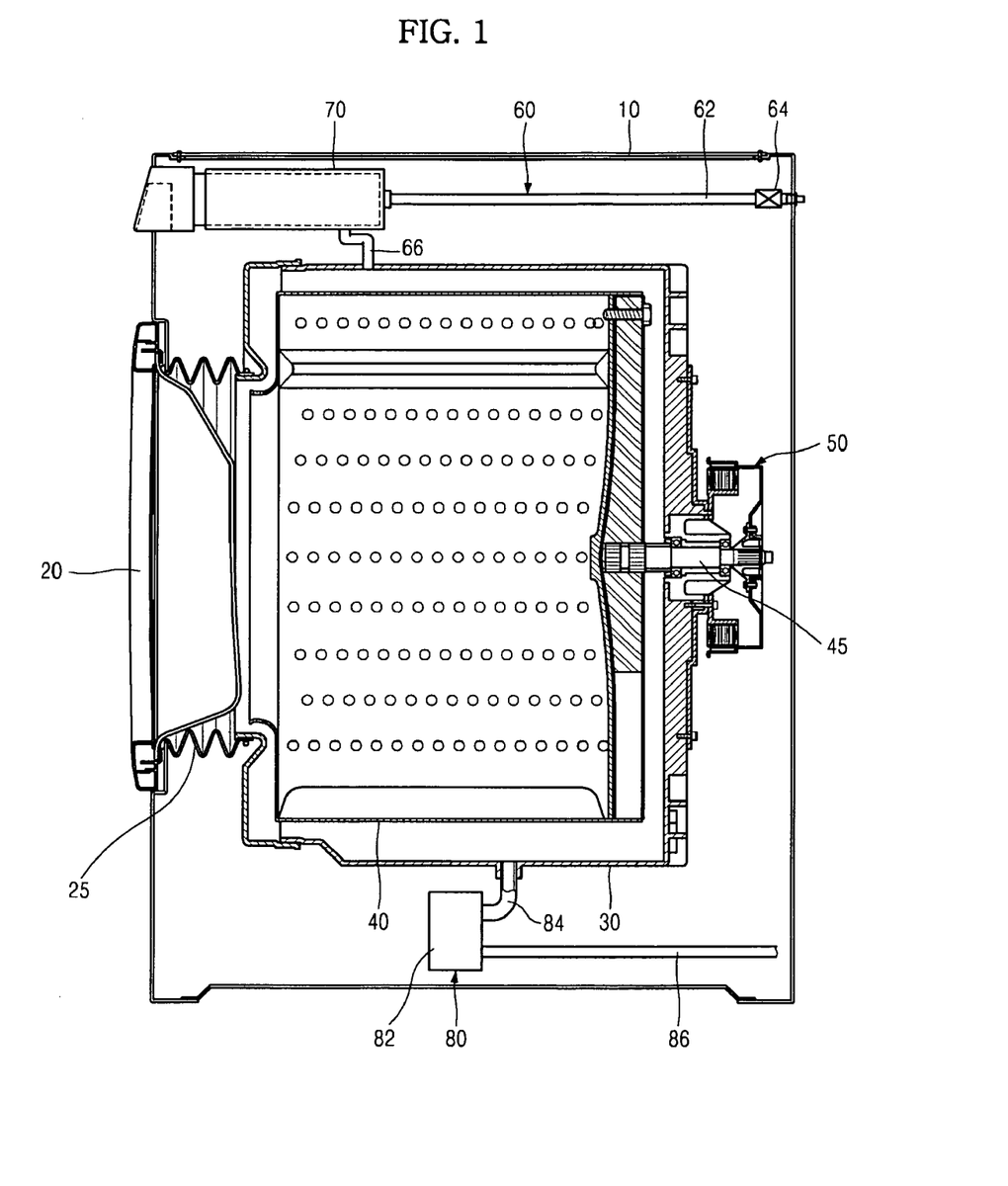
FIG. 1 shows a drum washing machine according to a first exemplary embodiment.

FIG. 1 exemplarily shows a drum washing machine according to an exemplary embodiment. Referring to FIG. 1, a drum washing machine to prevent an accident, particularly a drowning accident, from occurring includes a main body 10, a door 20, a tub 30, a drum 40, a motor 50, a water-supply unit 60, a detergent box 70, and a water-drain unit 80.

The main body 10 forms the appearance of the drum washing machine. An inlet through which laundry is inserted or removed by a user is located at one side of the main body 10. The door 20 opening or closing the inlet is mounted to the main body 10. A gasket 25 sealing a gap between the door 20 and the inlet is mounted at the circumference of the inlet.

The tub 30 is fixedly installed in the main body 10, and includes water supplied from the water-supply unit 60. The water motor 50 rotating the drum 40 is mounted to the outside of the tub 30.

The drum 40 is formed in a shape corresponding to that of the tub 30, is installed into the tub 30, and rotates clockwise or counterclockwise in the tub 30. One side of the drum 40 is open or the other side includes a plurality of holes. When the door 40 is open, laundry is put in the drum 40 through the opening part of the drum 40, and water is supplied to the drum 40 through a plurality of holes formed in the remaining parts of the drum 40. A rotation axis 45 is mounted to the outside of the drum 40, and is extended to the outside of the tub 30, such that the extended rotation axis 45 is connected to the washing motor 50 mounted to the outside of the tub 30.

The washing motor 50 rotates in response to the driving of an inverter 125, and the drum 40 is rotated by a rotational force generated from the washing motor 50, so that washing, rinsing, and dehydration processes of the laundry contained in the drum 40 are carried out. The washing motor 50 is rotated by a physical force applied to the drum 40 when the washing machine is not driven (i.e., a standby mode). That is, the washing motor 50 and the drum 40 work with each other.

The water-supply unit 60 includes water-supply pipes 62 and 66 and a water-supply valve 64. In this case, the water-supply pipe 62 is connected to an external water pipe (not shown) to receive water from the external water pipe, and directs the received water to the inside of the tub 30 and the drum 40. The water-supply pipe 62 is connected to the detergent box 70, and the other water-supply pipe 66 is connected between the detergent box 70 and the tub 30. Therefore, in a water-supply mode, water supplied from the external water pipe passes through the detergent box 70, so that the water including a detergent is supplied to the inside of the tub 30 and the drum 40. The opening/closing operations of the water-supply valve 64 are controlled in washing and rinsing processes, so that the supply of water into the tub 30 and the drum 40 is adjusted.

The detergent box 70 stores a detergent provided by a user. In a washing process, water is applied to the detergent box 70 through the water-supply pipe 62.

The water-drainage unit 80 includes a pump 82 and water-drain pipes 84 and 86. In the draining and dehydration processes, the pump 82 pumps water contained in the tub 30 and the drum 40 through the water-drain pipe 84 located at a lower part of the tub 30, so that the water is drained to the outside of the main body 10 through the water-drain pipe 86 connected to the pump 82.

Figure 2:
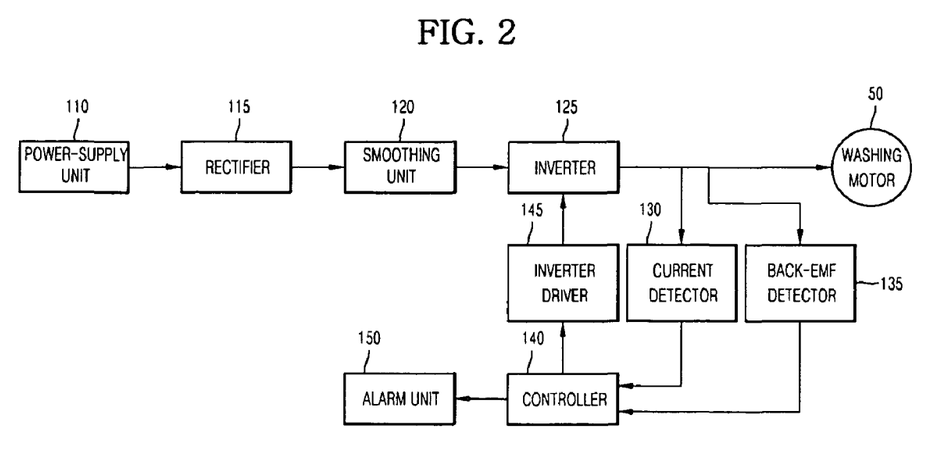
FIG. 2 is a block diagram illustrating a drum washing machine according to the exemplary embodiment.

FIG. 2 is a block diagram illustrating a drum washing machine according to an exemplary embodiment. Referring to FIG. 2, a drum washing machine to prevent an accident from occurring includes a power-supply unit 110, a rectifier 115, a smoothing unit 120, an inverter 125, a current detector 130, a back electromotive force detector 135, a controller 140, an inverter driver 145, and an alarm unit 150.

The power-supply unit 110 is connected to an external power-supply part (not shown), receives commercial alternating current (AC) power from the external power-supply part, and transmits the received commercial AC power to the rectifier 115. The rectifier 115 includes a plurality of diodes, rectifies the AC power received from the power-supply unit 110, and transmits the rectified AC power to the smoothing unit 120.

A reactor (not shown) is connected between the power-supply unit 110 and the rectifier 115, and compensates for a power factor of the AC power generated from the power-supply unit 110, so that it reduces harmonic waves of the AC power, so as to stabilize a current signal of the AC power.

The smoothing unit 120 includes at least one capacitor, smoothes a power source received from the rectifier 115, converts the smoothed power source into a predetermined DC power to drive the washing motor 50, and outputs the converted DC power to the inverter 125, to reduce ripple currents of the power source rectified by the rectifier 115.

The inverter 125 includes a plurality of inverters used as power-switching elements that convert the DC power received from the smoothing unit 20 into three-phase AC power. The inverters contained in the inverter 125 are respectively driven by an indication or command of the inverter driver 145, to modulate a pulse width applied to the washing motor 50.

In a driving mode of the drum washing machine, the washing motor 50 receives voltage and current signals corresponding to the modulated pulse width generated from the inverter 125, and rotates in response to the received voltage and current signals. If the drum 40 is rotated by a physical force applied thereto when the drum washing machine is not driven in a standby mode in which a standby power flows in the drum washing machine, the washing motor 50 rotates together with the drum 40, so that a back electromotive force is generated from the washing motor 50.

In this case, the washing motor 50 is exemplarily a brushless DC (BLDC) motor. The washing motor 50 serving as the BLDC motor includes a permanent magnet (i.e., a rotor) connected to a rotation axis 45, and a yoke and a coil (i.e., a stator) provided at the circumference of the permanent magnet. If the rotation axis 45 of the washing motor 50 is rotated by a physical force applied to the drum 40, the permanent magnet rotates together with the rotation axis 45, and a back electromotive force is generated from the coil by the rotation of the permanent magnet. This back electromotive force is detected form an input part of the washing motor 50 connected to the inverter 125. This back electromotive force is proportional to a variation of magnetic flux passing through the coil. Thus, the higher the rotation speed of the rotation axis 45, the higher the back electromotive force.

The current detector 130 detects a current signal flowing in the washing motor 50 when the washing motor 50 rotates in an operation mode state, and transmits the detected current signal to the controller 140. If the washing motor 40 is rotated in either the operation mode of the drum washing machine or the standby mode in which the drum washing machine is not driven, the back electromotive force detector 135 detects a back electromotive force generated from the washing motor 50, and transmits the detected back electromotive force to the controller 140.

The controller 140 transmits a rotation speed of the washing motor 50 to the inverter driver 145, compares the current signal detected by the current detector 130 with a predetermined instruction current, and transmits a rotation-speed correction signal of the washing motor corresponding to a difference between the detected current signal and the instruction current signal to the inverter driver 145, to control the washing motor 50 to rotate at a predetermined rotation speed.

The controller 140 determines whether a voltage signal of the back electromotive force generated from the back electromotive force detector 135 is within a predetermined reference range in either an operation mode of the drum washing machine or a standby mode in which the drum washing machine is not driven. If the detected back electromotive force voltage signal is out of the predetermined reference range, the controller 140 determines whether a period of waveforms of the back electromotive force is periodic. In this case, if the voltage period of the back electromotive force is non-periodic, the controller 140 controls the output of the alarm unit 150.

In addition, if the detected back electromotive force voltage signal is out of the reference range, the controller 140 may also control the output of the alarm unit 150.

In other words, although the back electromotive force of the washing motor is periodically generated in response to a control command of the controller 140, the back electromotive force of the washing motor periodically appears by a physical force applied to the drum in a non-driving status of the standby mode, so that the controller 140 determines that a child or pet is present in the drum when the back electromotive force is non-periodic, thus generating the alarm sound.

The inverter driver 145 transmits driving signals of several inverters corresponding to rotation speeds transferred from the controller 140 to the inverter 125. The alarm unit 150 outputs an alarm sound in response to the instruction of the controller 140, to prevent an accident from occurring. In this case, the alarm sound may be any form of audiovisual indication.

Figure 3:
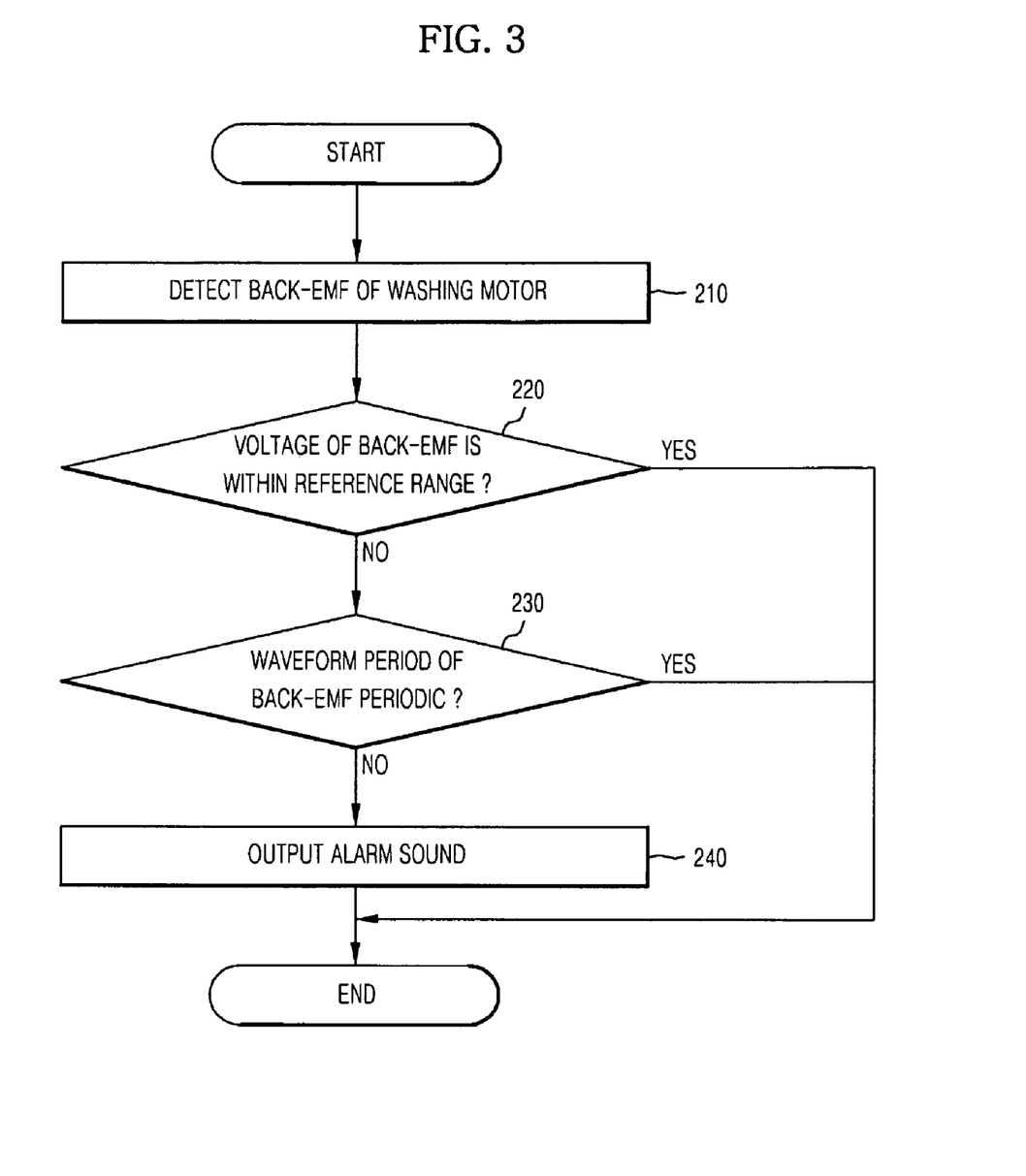
FIG. 3 is a flow chart illustrating a drum washing machine operation according to the exemplary embodiment.

FIG. 3 is a flow chart illustrating a drum washing machine operation according to an exemplary embodiment. Operations of the drum washing machine will hereinafter be described with reference to FIGS. 2, 3, 4, and 5.

In a standby mode in which the power-supply unit 110 is connected to an external power source, the drum washing machine transmits a standby power to each driver. In this case, the washing motor 40 is in a non-driving status.

In other words, the drum washing machine detects a back electromotive force of the washing motor 50 of the non-driving status using the back electromotive force detector 135 at operation S210. Based on the back electromotive force detected by the back electromotive force detector 135, it is determined whether a child or pet is present in the drum washing machine.

The back electromotive force generated from the washing motor when the drum washing machine is not operated (i.e., a non-periodic status) will hereinafter be described with reference to FIGS. 4 and 5.

Figure 4:
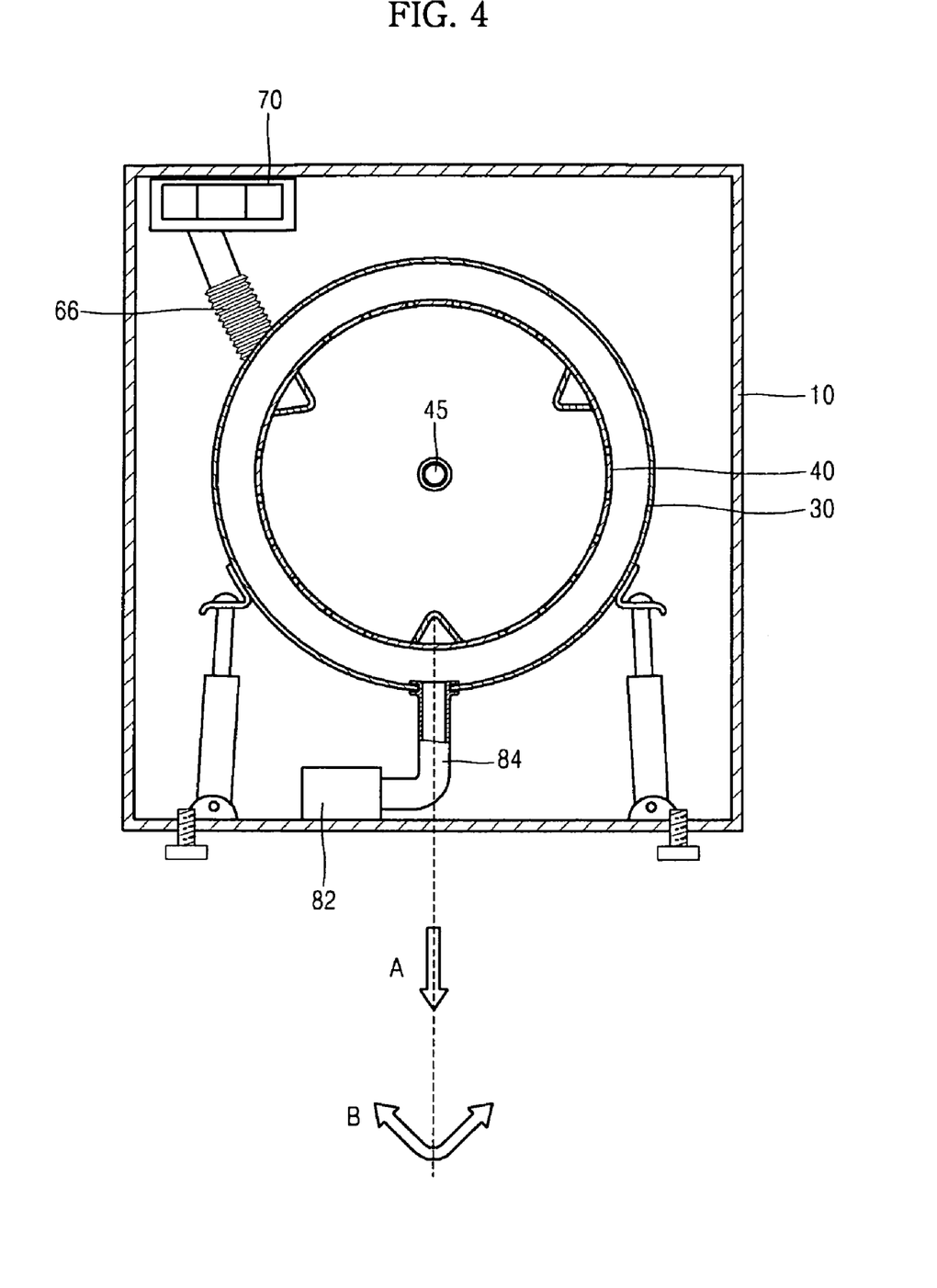
FIG. 4 shows the direction of a force applied to a washing motor of a drum washing machine according to the exemplary embodiment.

FIG. 4 exemplarily shows the front appearance of the drum washing machine according to an exemplary embodiment. When laundry is placed in the drum 40 of the drum washing machine shown in FIG. 1, a physical force caused by the drop of laundry is temporarily applied to the drum 40, and then the drum 40 is not operated any more, so that only a gravitational force, 'A', caused by the weight of laundry is applied to the washing motor 50 working with the drum 40. Accordingly, no back electromotive force occurs in the washing motor 50.

In contrast, if it is determined that a child or pet in addition to the laundry is present in the drum 40 of the drum washing machine, a physical force is applied to the drum 40 by the movement of the child or pet having at least a predetermined force, and at least one of both-side forces 'B' is applied to the drum 40, so that the drum 40 rotates by the applied B force. The drum 40 and the washing motor 50 work with each other, and the same force as that of the drum 40 is also applied to the washing motor 50, so that the washing motor 50 rotates by this force. Accordingly, the back electromotive force occurs in the washing motor 50 due to the rotation of the washing motor 50, where the back electromotive force has a voltage that exceeds a reference range according to the movement of the child or pet.

In this case, the reference range is in the voltage range of the back electromotive force generated from the washing motor 50 which works with the drum 40 when the drum 40 rotates by a child or pet having a predetermined force.

Figure 5:
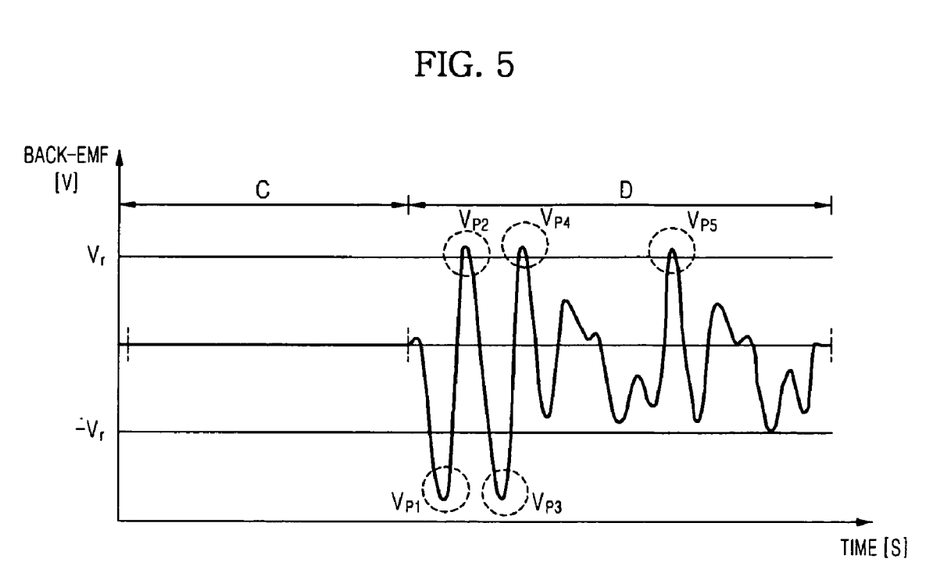
FIG. 5 is a graph of a back electromotive force generated from a washing motor of a drum washing machine according to the exemplary embodiment.

FIG. 5 is a graph of a back electromotive force generated from a washing motor of a drum washing machine according to an exemplary embodiment.

If only laundry is contained in the drum 40 of the drum washing machine, no back electromotive force occurs in the washing motor 50 as shown in a period 'C' of FIG. 5. In contrast, if a child or pet enters the drum 40 of the drum washing machine, a back electromotive force having a voltage (Vp1 to Vp5) exceeding a reference range (−Vr<Vp<Vr) occurs in the washing motor 50 during period 'D' of FIG. 5. It can be recognized that a voltage waveform of the back electromotive force is non-periodic according to irregular moving characteristics of the child or pet.

According to the above-mentioned operation to determine the possibility of generating an accident when a child or pet enters the drum washing machine on the basis of the back electromotive force detected by the back electromotive force detector 135, it is determined whether the back electromotive force detected by the washing motor 50 was generated by the drop of laundry or another back electromotive force generated by a child or pet. For this operation, it is determined whether the voltage of the back electromotive force detected by the back electromotive force detector 135 is within the reference range (−Vr<Vp<Vr) at operation S220. In this case, if it is determined whether the detected back electromotive force voltage is one of voltages (Vp1 to Vp5) exceeding the reference range (−Vr<Vp<Vr), it is first determined that a child or pet is present in the drum washing machine.

Next, a time point at which a peak voltage of each period has occurred in a voltage waveform of the back electromotive force is decided, and it is determined whether the voltage waveform period of the back electromotive force is periodic at operation S230. If the voltage waveform period of the back electromotive force is non-periodic at operation S230, it is again determined that a child or pet is present in the drum washing machine, so that the alarm unit 150 outputs an alarm sound at operation S240. In addition, if the detected back electromotive force voltage is out of the reference range, the alarm unit 150 may also output the alarm sound.

In this way, if the child or pet is in the drum washing machine, the drum washing machine informs user of the presence of the child or pet, and thereby prevents drowning.

Figure 6:
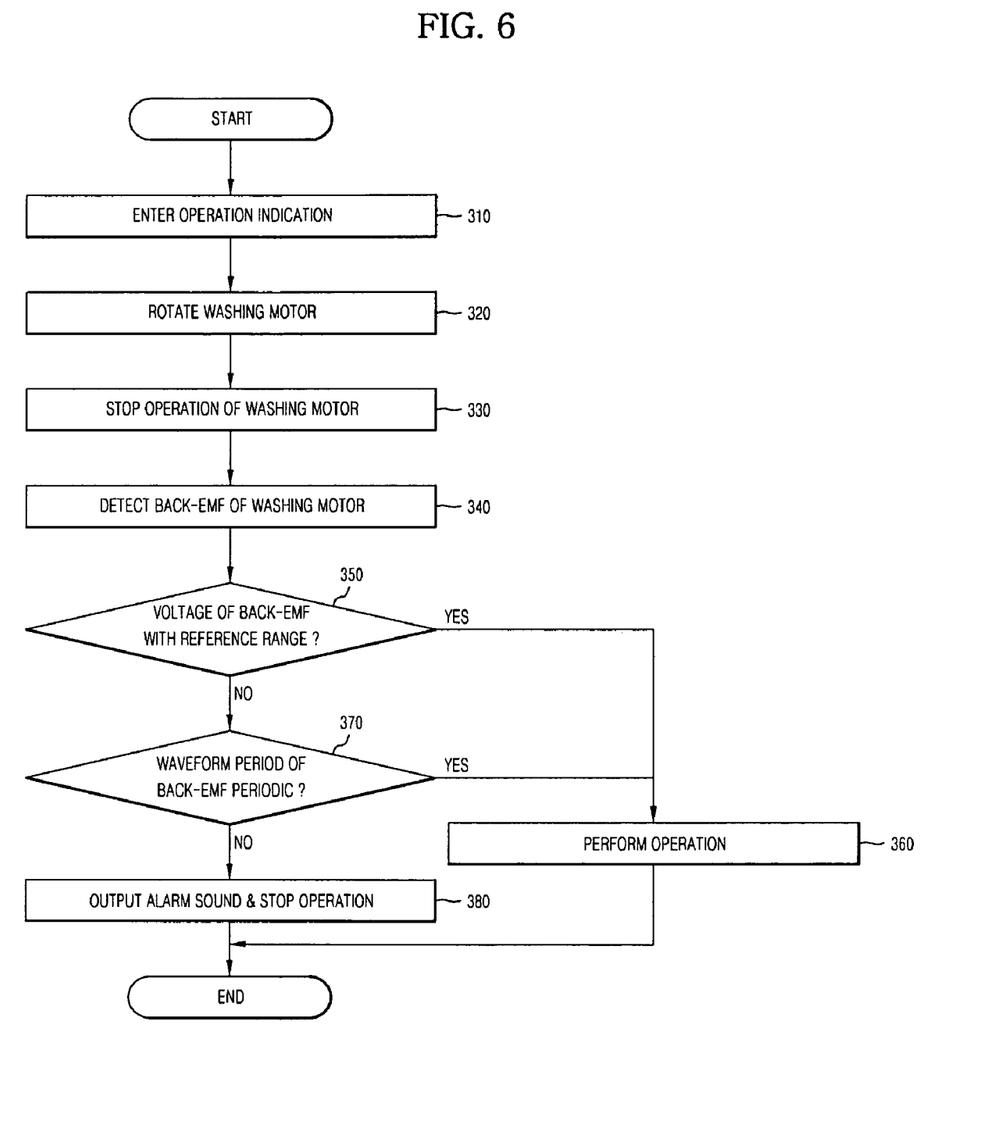
FIG. 6 is a flow chart illustrating a method for controlling a drum washing machine according to another embodiment.

FIG. 6 is a flow chart illustrating a method of controlling a drum washing machine according to another embodiment.

A drum washing machine according to another embodiment further includes an input unit (not shown) composed of an operation power button, an operation course button, an operation indication button, etc.

If the power-supply unit 110 of the drum washing machine is not connected to an external power source, no standby power is applied to the drum washing machine, so that the above process to determine the presence or absence of the child or pet is not carried out. In order to operate the drum washing machine, if a user connects the power-supply unit 110 of the drum washing machine to an external power source, presses the operation power button and the operation course button through the input unit, and enters an operation indication at operation S310, the drum washing machine rotates the washing motor 50 clockwise or counterclockwise at a predetermined speed for a predetermined time at operation S320, to determine whether a child or pet is present in the drum washing machine.

In this case, provided that a child or pet falls asleep in the drum washing machine, the above-mentioned rotating of the washing motor 50 is needed for the drum 40 to move by the child or pet.

Next, if the washing machine 50 stops rotation at operation S330, a back electromotive force generated from the washing motor 50 is detected at operation S340, and it is determined whether the voltage corresponding to a back electromotive force detected by the back electromotive force detector 135 is within a reference range (−Vr<Vp<Vr) at operation S350. In this case, if the voltage of the back electromotive force detected by the back electromotive force detector 135 is within the reference range (−Vr<Vp<Vr), the driving of the drum washing machine is continuously performed at operation S360. If the detected back electromotive force voltage is any one of voltages (Vp1 to Vp5) exceeding the reference range (−Vr<Vp<Vr), it is primarily determined that a child or pet is present in the drum washing machine.

Next, a time at which a peak voltage of each period has occurred in a voltage waveform of the back electromotive force is decided, and it is determined whether the voltage waveform period of the back electromotive force is periodic at operation S370. If the voltage waveform period of the back electromotive force is periodic at operation S370, the operation of the drum washing machine is continuously performed at operation S360. Otherwise, if the voltage waveform period of the back electromotive force is non-periodic at operation S370, it is determined that a child or pet is present in the drum washing machine, so that the alarm sound is output to inform parents or a user of the presence of the child or pet in the drum washing machine. In order to prevent a more serious accident from occurring, the drum washing machine stops operation at operation S380.

In addition, when the door 20 is locked, but the washing machine detects a living thing (i.e., child or pet) is in the drum 40, the washing machine can automatically unlock the door 20. Therefore, the user can remove the child or pet from the drum 40.

Figure 7:
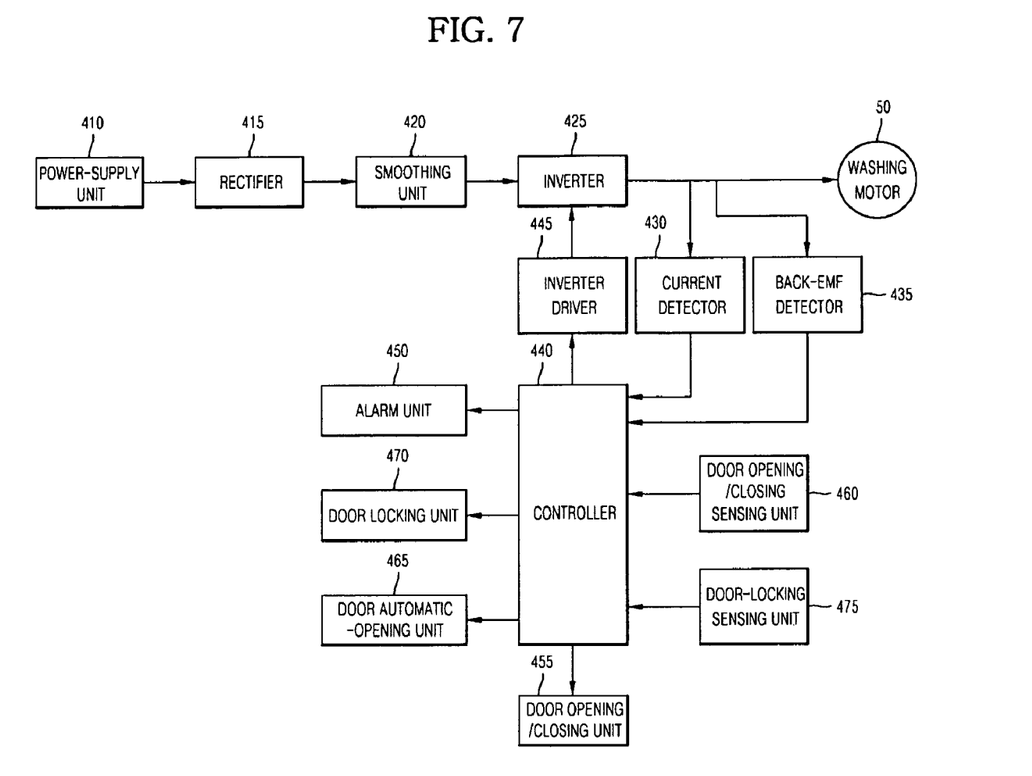
FIG. 7 is a block diagram illustrating a method of controlling a drum washing machine according to yet another embodiment.

FIG. 7 is a block diagram illustrating a method for controlling a drum washing machine according to yet another embodiment. The drum washing machine includes a power-supply unit 410, a rectifier 415, a smoothing unit 420, an inverter 425, a current detector 430, a back electromotive force detector 435, a controller 440, an inverter driver 445, an alarm unit 450, a door opening/closing unit 455, a door opening/closing sensing unit 460, a door automatic-opening unit 465, a door locking unit 470, and a door-locking sensing unit 475. Detailed description of the above-mentioned elements will hereinafter be described with reference to FIG. 1.

In this case, the power-supply unit 410, the rectifier 415, the smoothing unit 420, the inverter 425, the current detector 430, the back electromotive force detector 435, the inverter driver 445, and the alarm unit 450 respectively correspond to the power-supply unit 110, the rectifier 115, the smoothing unit 120, the inverter 125, the current detector 130, the back electromotive force detector 135, the inverter driver 145, and the alarm unit 150 of FIG. 2, and as such a detailed description thereof will be omitted herein for convenience of description.

The door opening/closing unit 455 is installed at the door 20, and is connected to the main body 10, to shield the inside of the drum 40. The door opening/closing unit 455 is provided at a knob of the door 20, and includes a lever (not shown), a hook (not shown), and a torsion spring (not shown). The lever is operated by a user. The hook is interoperable with the lever, and is inserted into a door switch (not shown) or is detached from the door switch. The torsion spring detects elasticity of the lever, and maintains an original position of the lever. In this case, the door switch is provided at the main body 10, and controls the opening/closing operation of the door opening/closing unit 455.

The door opening/closing sensing unit 460 detects a connection status between the door 20 and the door switch of the main body 10, and transmits the detected result to the controller 440. When the back electromotive force is generated from the washing motor 50 by the drum 40 rotated by a physical force, the door automatic-opening unit 465 detaches the hook of the door opening/closing unit 455 from the door switch, so that the inside of the drum 40 can be automatically opened.

The door locking unit 470 controls the locking status of the door opening/closing unit 455 in order to prevent the door 20 from being arbitrarily opened in an operation mode of the drum washing machine, the door-locking sensing unit 475 detects the locking status of the door 20, and transmits the detected result to the controller 440.

In case of the door 20 having the door opening/closing unit 455 and the door locking unit 470, a door switch of the main body 10 is electrically released from the locking status when the drum washing machine is in a standby mode. If the user pulls the lever of the door opening/closing unit 455, the hook of the door opening/closing unit 455 is released from the door switch of the main body 10, so that the door is opened. If the drum washing machine is in the operation mode, the door switch of the main body 10 is electrically released from the locking status, the hook of the door opening/closing unit 455 does not move, and the user is unable to pull the lever of the door opening/closing unit 455 so that the door 20 is closed.

When the back electromotive force occurs in the washing motor 50 by the drum 40 rotated by a physical force, the controller 440 analyzes this back electromotive force, determines the possibility of generating an accident in the drum washing machine, and outputs the alarm sound generated by the alarm unit 450 according to the determined result.

If the presence of the possibility of generating the accident in the drum washing machine is determined, the controller 440 determines the opening/closing and locking states of the door 20 on the basis of the determined result received from the door opening/closing sensing unit 460 and the door-locking sensing unit 475, and controls operations of the door automatic-opening unit 465 and the door-locking unit 470, so that the inside of the closed drum 30 can be open by the automatic opening of the door 20.

Figure 8:
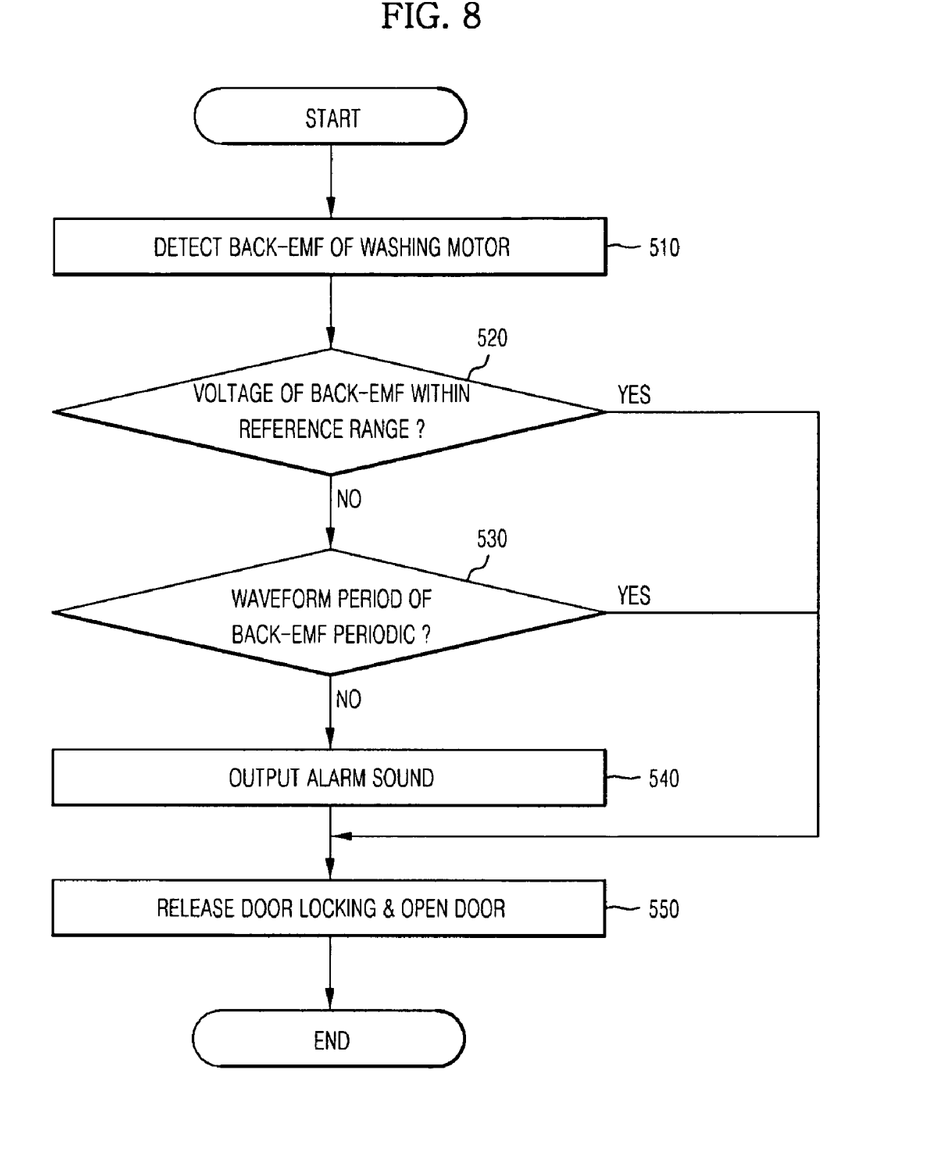
FIG. 8 is a flow chart illustrating a method for controlling a drum washing machine according to still another embodiment.

FIG. 8 is a flow chart illustrating a method for controlling a drum washing machine according to yet another embodiment.

In a standby mode in which the power-supply unit 410 of the drum washing machine is connected to an external power source, the drum washing machine provides each driver with a standby power. In this case, the washing motor 50 is in a non-operation state.

In other words, the back electromotive force of the washing motor 50 of the non-operation state is detected at operation 510 by the back electromotive force detector 435. It is determined whether the detected back electromotive force is a back electromotive force generated by the drop of laundry or another back electromotive force generated by a child or pet. For this operation, the voltage of the back electromotive force detected by the back electromotive force detector 435 is in the reference range ($-Vr<Vp<Vr$) at operation S520. In this case, if the detected back electromotive force voltage is one of voltages (Vp1 to Vp5) exceeding the reference range ($-Vr<Vp<Vr$), the possibility of generating an accident that a child or pet is present in the drum washing machine is primarily determined. In this case, if it is determined that the child or pet is present in the drum washing machine, the drum washing machine may also generate the alarm sound.

A time point at which a peak voltage of each period has occurred in a voltage waveform of the back electromotive force is decided, and it is determined whether the voltage waveform period of the back electromotive force is periodic at operation S530. If the voltage waveform period of the back electromotive force is non-periodic at operation S530, it is determined that a child or pet is present in the drum washing machine.

In this way, if it is determined that the child or pet is present in the drum washing machine, the alarm sound is generated at operation S550, so that a user or guardian can prevent the occurrence of an accident in the drum washing machine.

The opening/closing status of the door 20 is determined on the basis of the detection result of the door opening/closing sensing unit 460. If the door 20 is closed, the locking status of the door 20 is determined on the basis of the detection result of the door-locking sensing unit 475. In this case, if it is determined that the door 20 is in a locking status, the door 20 is released from the locking status at operation S540, so that a guardian or user can easily remove the child or pet from the drum washing machine.

Because the child or pet contained in the drum washing machine has difficulty in opening the door 20, it is determined whether the door 20 is locked when the door 20 is closed. In this case, if the door 20 is released from the locking status, the door automatic-opening unit 465 is driven to detach the hook of the door opening/closing unit 455 from the door switch, so that the door 20 is automatically opened at operation S550.

If the door 20 is in the locking status, the door 20 is released from the locking status, the door automatic-opening unit 465 is driven to detach the hook of the door opening/closing unit 455 from the door switch, so that the door 20 is automatically opened at operation S550. As a result, the child or pet can easily escape from the inside of the drum washing machine.

As is apparent from the above description, the washing machine and a method for controlling the same according to embodiments of the disclosure prevents the occurrence of an accident in the washing machine.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of controlling a washing machine, comprising:
    detecting a back electromotive force of a washing motor; and
    controlling an output of an alarm sound by analyzing a periodicity of a waveform period of the back electromotive force.

2. The method according to claim 1, wherein the detecting of the back electromotive force of the washing motor includes detecting a back electromotive force generated by rotation of a drum at a standby mode in which standby power is provided.

3. The method according to claim 1, wherein the analyzing of the periodicity of the waveform period of the back electromotive force includes:
   determining whether a magnitude of the back electromotive force is equal to or less than a reference range; and
   analyzing the periodicity of the waveform period of the back electromotive force when the magnitude of the back electromotive force is greater than the reference range.

4. The method according to claim 1, wherein the controlling of the output of the alarm sound includes:
   outputting the alarm sound when the periodicity of the waveform period of the back electromotive force is non-periodic.

5. A method of controlling a washing machine, comprising:
   detecting a back electromotive force of a washing motor; and
   controlling an opening of a door by analyzing a periodicity of a waveform period of the back electromotive force.

6. The method according to claim 5, wherein the controlling of the opening of the door includes:
   detecting an opening operation of the door when the periodicity of the waveform period of the back electromotive force is non-periodic; and
   automatically opening the door when detected that the waveform period is non-periodic door is closed.

7. The method according to claim 5, further comprising:
   outputting an alarm sound when detected that the periodicity of the waveform period of the back electromotive force is non-periodic.

8. A method of controlling a washing machine, comprising:
   rotating a washing motor for a predetermined period of time upon receiving a command starting an operation of the washing machine;
   detecting a back electromotive force of the washing motor; and
   analyzing a periodicity of a waveform period of the back electromotive force, and controlling whether the washing machine is operated or not based on the analyzed periodicity.

9. The method according to claim 8, further comprising:
   outputting an alarm sound when analyzed that the periodicity of the waveform period of the back electromotive force is non-periodic.

10. The method according to claim 8, wherein the analyzing of the periodicity of the waveform period of the back electromotive force includes:
    determining whether a magnitude of the back electromotive force is equal to or less than a reference range; and
    analyzing the periodicity of the waveform period of the back electromotive force when the magnitude of the back electromotive force is greater than the reference range.

11. The method according to claim 8, wherein the analyzing of the waveform period of the back electromotive force includes:
    stopping the operation of the washing machine when the periodicity of the waveform period of the back electromotive force is analyzed to be non-periodic.

12. A washing machine comprising:
    a drum;
    a washing motor connected to the drum;
    a back electromotive force detector to detect a back electromotive force of the washing motor;
    a controller to control output of an alarm sound by analyzing a periodicity of a waveform period of the back electromotive force; and
    an alarm unit to output an alarm sound according to an indication of the controller.

13. The washing machine according to claim 12, wherein the controller determines whether the magnitude of the back electromotive force is equal to or less than a reference range, and analyzes the periodicity of the waveform period of the back electromotive force when determined the magnitude of the back electromotive force is greater than the reference range.

14. The washing machine according to claim 12, further comprising:
    a door to open or close the drum; and
    an automatic door opening unit to automatically open the door,
    wherein the controller controls the automatic door opening unit to automatically open the door when determined the periodicity of a waveform period of the back electromotive force is non-periodic.

15. The washing machine according to claim 12, further comprising:
    a door to open or close the drum; and
    a door locking unit to control locking of the door,
    wherein the controller controls the door locking unit to release the door when determined the periodicity of the waveform period of the back electromotive force is non-periodic.

16. The washing machine according to claim 12, further comprising:
    an input unit through which an operation start command is entered,
    wherein the controller controls rotation of the washing motor for a predetermined period of time upon receiving the operation start command from the input unit.

17. The washing machine according to claim 16, wherein the controller determines whether the magnitude of the back electromotive force is equal to or less than a reference range when the washing motor stops rotation, and analyzes the periodicity of the waveform period of the back electromotive force when the magnitude of the back electromotive force is greater than the reference range.

18. The washing machine according to claim 17, wherein the controller performs the operation when the periodicity of the waveform period of the back electromotive force is periodic, and stops the operation when the periodicity of the waveform period of the back electromotive force is non-periodic.

19. A method of controlling a washing machine, comprising:
    detecting a back electromotive force of a washing motor when the washing machine is not operated;
    determining whether the magnitude of the back electromotive force is equal to or less than a reference range; and
    outputting an alarm sound when the magnitude of the back electromotive force is greater than the reference range.

20. The method according to claim 19, further comprising:
    analyzing a periodicity of a waveform period of the back electromotive force when the magnitude of the back electromotive force is greater than the reference range.

21. The method according to claim 20, further comprising:
    outputting an alarm sound when the periodicity of the waveform period of the back electromotive force is non-periodic.

* * * * *